United States Patent [19]
Leith

[11] Patent Number: 5,857,915
[45] Date of Patent: Jan. 12, 1999

[54] TWO-PIECE ELECTRIC MOTOR SHAFT

[75] Inventor: Donald G. Leith, West Bloomfield, Mich.

[73] Assignee: Panther Machine, Inc., Wixom, Mich.

[21] Appl. No.: 804,007

[22] Filed: Feb. 21, 1997

Related U.S. Application Data

[60] Provisional application No. 60/016,001 Apr. 23, 1996.

[51] Int. Cl.$^6$ .................................................... F16C 3/04
[52] U.S. Cl. ..................... 464/179; 403/350; 403/DIG. 8
[58] Field of Search .................................. 464/179, 180; 403/DIG. 8, 350, 305, 306, 314, 361

[56] References Cited

U.S. PATENT DOCUMENTS

| | | | |
|---|---|---|---|
| 3,485,220 | 12/1969 | Alexander | 464/179 |
| 4,295,069 | 10/1981 | Givan et al. . | |
| 4,460,346 | 7/1984 | Behnke | 464/179 |
| 5,252,879 | 10/1993 | Romberg et al. . | |
| 5,293,684 | 3/1994 | Fry . | |

FOREIGN PATENT DOCUMENTS

| | | | |
|---|---|---|---|
| 661755 | 11/1951 | United Kingdom | 403/350 |

*Primary Examiner*—Eileen Dunn Lillis
*Attorney, Agent, or Firm*—Gifford, Krass, Groh, Sprinkle, Patmore, Anderson & Citkowski ,P.C.

[57] ABSTRACT

A two-part electric motor shaft assembly. The assembly includes an elongated shank member which has a cavity hollowed out at one end. A cam pin has one end configured to be received in the shank cavity and secured thereto. The other end of the cam pin forms a cam surface which is eccentric with respect to a longitudinal axis defined by the elongated shank member. By utilizing a two-piece design, the shank member may be formed of a softer and less expensive material than the alloy steel used to form the cam pin since the shank member is subjected to less loading and wear. The two-part motor shaft assembly of the present invention eliminates the stress riser that occurs with application of loading to the transition joint of a single piece design.

8 Claims, 1 Drawing Sheet

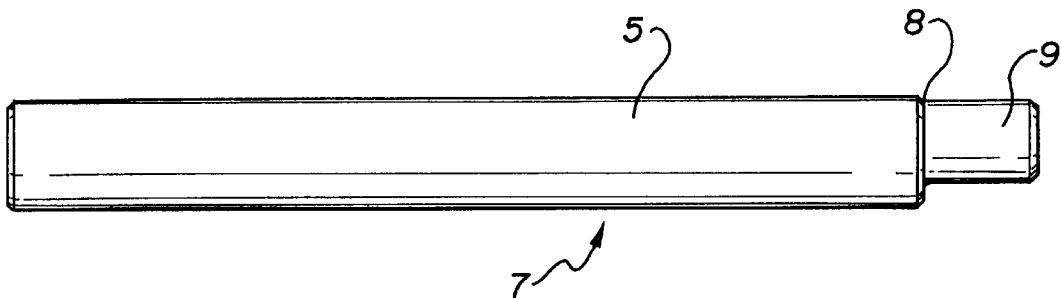
FIG-1
PRIOR ART
FIG-2B
FIG-2A
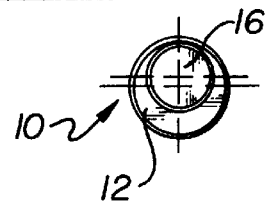
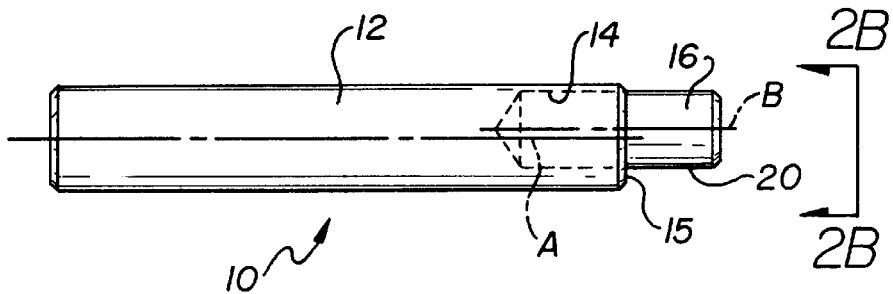
FIG-3
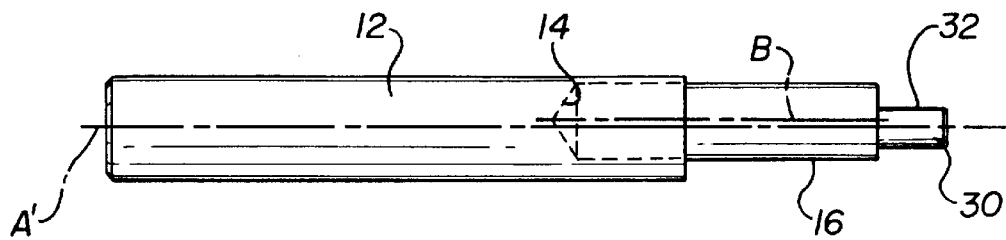

TWO-PIECE ELECTRIC MOTOR SHAFT

CROSS-REFERENCE TO RELATED APPLICATION

This application claims the benefit of provisional application No. 60/016,001 filed on Apr. 23, 1996, the disclosure of which is hereby incorporated by reference.

FIELD OF THE INVENTION

This invention concerns the field of electric motor shafts and, more particularly, to such a motor shaft which is formed in two pieces for increased strength and improved performance.

BACKGROUND OF THE INVENTION

Conventionally, electric motor shafts with an eccentric cam, such as those used in antilock braking systems, are cast, forged or machined in a single piece. A typical electric motor shaft of this type is either forged, cast or machined out of a solid bar stock of alloy steel. Such a manufacture must be used because the shaft must subsequently be hardened and ground so that the finished shaft includes a larger diameter shank portion and a smaller diameter cam pin.

These one-piece shafts of the type used for anti-lock braking systems require a stress curve ground into the transition zone between the larger diameter shank portion and the smaller diameter cam pin. The purpose of this stress curve is to minimize the stress riser that occurs when the transition zone is subject to loading during application of the vehicle brakes. Since these electric motor shafts are a critical component in the anti-lock braking system, failure thereof could be the direct cause of loss of life and other disastrous consequences. Thus, it is particularly important that electric motor shafts used for this application, as well as for many others, be completely reliable.

The stress riser is inherent in the one-piece shaft because of the transition between the larger diameter shank portion and smaller diameter cam pin. Thus, the transition zone becomes a natural weak point in prior art one-piece shafts, and preventing failure in this transition zone has become an important design consideration driving the size, configuration, and material used to fabricate the shafts. Since the stress riser is inherent to the design and can only be minimized, the vehicle industry has developed specific reliability tests to assure shaft integrity and eliminate bending or breaking of the cam pin. For example, in order to pass the Static Flexure Test (Bend Test), the cam pin is inserted into a mating hole in a metal plate of the testing apparatus. A static load of 90 nm is then applied to the shank portion. The cam pin must not bend or break at this minimum load. In order to pass this test, one-piece motor shafts must be of sufficient diameter and incorporates an appropriate stress curve.

Similarly, the Impact Test (energy absorption) subjects a rigidly locked motor shaft to a 70 pound weight dropped from a height of 32 inches so that the weight impacts the cam pin. The testing apparatus records the energy required to break the cam pin off the shank portion of the shaft. Again, the stress curve at the transition zone is the area of vulnerability in this test, and any failure will inevitably occur in this area.

However, while the cam pin requires alloy steel and heat treating to provide a hard, nonwearing inner race surface for the needle bearings, the shank portion of the shaft can remain relatively soft. Hence, using relatively expensive alloy material to form the shank portion of the shaft represents a significant and unnecessary cost to the manufacturer.

Thus, the current one-piece motor shaft has at least two distinct disadvantages; first, it wastes relatively expensive material in the shank portion which is not subject to the same high bearing stresses as the outer surface of the cam pin; secondly, it inherently has a zone of transition from greater to lesser diameter that is particularly vulnerable to breakage.

It would be advantageous for an electric motor shaft such as is used in the anti-lock braking systems of motor vehicles to be designed to eliminate one or both of these undesirable qualities.

SUMMARY OF THE INVENTION

The present invention has been designed to overcome the disadvantages of the prior art described above. The electric motor shaft of the present invention is constructed as a two-piece assembly including a main, elongated shank member and a smaller diameter cam pin which is inserted into a cavity formed at an end of the shank member and secured to the shank member. This two-piece design eliminates the previously known transition zone between the larger diameter shank portion and the smaller diameter cam pin inherent in the present one-piece shaft design.

Furthermore, the size of the two-piece assembly can be scaled down considerably from the prior art, one-piece design. The reduction in size is accomplished without compromising shaft strength because of the elimination of the vulnerable transition zone discussed above. In fact, it has unexpectedly been found that the two-piece shaft of the present invention when pressed into its bearing location exhibits an even greater improvement in strength for similar sized pieces than would have been predicted.

In a first embodiment of the two-piece electric motor shaft of the present invention, the elongated shank member has a length and defines a first longitudinal axis. One end of the shank member has a cavity which extends for a portion of the distance of the elongated shank member and along an axis which is radially spaced from the axis of the shank member. The cavity opens out onto the end of the shank member. The invention further comprises a cam pin which has a first end dimensioned to fit into the cavity of the shank member. The cam pin is attached to the shank portion by a press fit, adhesive, welding or by any other conventional means. The other end of the cam pin forms a camming surface. The camming surface is eccentric with respect to the longitudinal axis of the shank portion.

In a further refinement of the two-piece electric motor shaft assembly of the present invention, the elongated shank member is formed of a material having a first index of hardness, and the cam pin is formed of a material having a second, and higher, index of hardness. It is contemplated that the elongated shank member will be fabricated of a relatively inexpensive material, such as common cold rolled steel (SAE 1008-1050). While this material has a lower hardness index than the alloy steel of which conventional one-piece electric motor shafts are formed, the additional strength and hardness of the more expensive material does not confer any performance advantage to the shank member of the two-piece motor assembly since the shank member is subjected to relatively low stress. However, the cam pin is formed of such alloy steel materials as SAE 52100 carbon steel (RC 60-63), hardened to specification.

Also disclosed and claimed is a method of forming a two-piece electric motor shaft assembly. The method includes forming an elongated shank member which defines a first longitudinal axis along its length, and hollowing out a cavity at one end thereof. The method further contemplates the step of forming a cam pin by configuring a first end of the cam pin to be received in the shank cavity and a second end which forms an eccentric camming surface. By press fitting or otherwise securing the cam pin into the shank member, the two-piece shaft assembly is formed.

BRIEF DESCRIPTION OF THE DRAWING

The following detailed description may best be understood by reference to the following drawing in which:

FIG. 1 illustrates a prior art one-piece electric motor shaft;

FIGS. 2A and 2B illustrate one embodiment of a two-part electric motor shaft assembly according to the present invention; and FIG. 3 illustrates yet another embodiment of the present invention.

DETAILED DESCRIPTION OF THE PREFERRED EMBODIMENT

Throughout the following detailed description, like numerals are used to reference the same elements of the invention shown in multiple figures thereof. FIG. 1 illustrates a prior art one-piece electric motor shaft 7 having a shank portion 5 and cam pin 9. The illustrated motor shaft 7 is intended to be used as part of the actuation system for anti-lock brakes. As can readily be seen, the shank portion 5 and cam pin 9 of the prior art motor shaft 7 are integral. Typically, the shaft 7 is forged or machined as a single piece, hardened and ground to specifications. Because the cam pin 9 is offset with respect to the shank portion 7, off center machining of the cam pin 9 proves necessary, a somewhat complicated and expensive machining step. A stress curve 8 is also ground into the shaft 7 at the junction of the cam pin 9 and shank portion 7.

FIGS. 2A and 2B illustrate a first embodiment of a two-part motor shaft 10 according to the present invention. The shaft 10 comprises an elongated shank member 12 having a longitudinal axis A. In this embodiment, a cylindrical cavity 14 (FIG. 2A) having a longitudinal axis B is formed at one end 15 of the elongated shank member 12 so that the axis B is radially offset but parallel to the axis A. A cylindrical cam pin 16 is inserted into the cavity 14. The cam pin 16 having an outer cylindrical surface 20 is secured to the shank member 12 by any conventional means, such as a press fit, adhesive, laser welding, spin welding, ultrasonic welding and the like.

Yet another embodiment is shown in FIG. 3. The FIG. 3 embodiment is similar to the FIG. 2A–2B embodiment except that an auxiliary bearing support 32 having an outer cylindrical surface 30 is machined on the outermost end of cam pin 16. This auxiliary bearing support 32 has an axis aligned with the axis A' of the shank member 12.

Tests conducted at an independent laboratory on the two-part electric motor shaft of the present invention confirm that this design has a significant advantage over the prior art one-piece design when pressed into its bearing location in the electric motor due to the total elimination of the stress curve at the joint transition between the larger and smaller diameters of the previously known one-piece design. These tests are summarized as follows:

Static Flexure Test (Bend Test in Test Order)

| Supplier | Results |
| --- | --- |
| X (one piece design) | 137.8 Nm |
| Y (one piece design) | 140.8 Nm |
| Z (one piece design) | 161.6 Nm |
| Panther 4 w/bearing (FIG. 2A, 2B) | 228.4 Nm |
| Panther 5 w/bearing (FIG. 2A, 2B) | 222.0 Nm |
| Panther 6 w/bearing (FIG. 2A, 2B) | 220.4 Nm |

Impact Test (Energy Test in Test Order)

| Supplier | Results |
| --- | --- |
| Panther 1 (FIG. 2A, 2B) | 64.7 Nm |
| X (one piece design) | 12.3 Nm |
| Y (one piece design) | 7.1 Nm |
| Z (one piece design) | 7.5 Nm |
| Panther 2 (FIG. 2A, 2B) | 75.7 Nm |
| Panther 3 (FIG. 2A, 2B) | 72.1 Nm |

A two-to-one advantage resulted from the Static Flexure Test (bend test) previously described when the present invention two-part shaft Panther samples 4–6 were tested within its bearing location. When the independent laboratory performed the Impact Test (energy absorption), which has also been previously described, the results confirm that the present invention Panther samples 1–3 have a five-to-one joint integrity advantage over the single piece conventional design, again due to the total elimination of the stress curve in the transition joint between the larger shank portion and the smaller cam pin.

As expected with the prior art one-piece design, all the bending and breakage failures occurred at the transition zone when the piece was under load. With the transition zone extended beyond the bearing support location, its strength is not improved with the bearing. Conversely, when the two-piece shaft of the present invention is tested to failure in the static flexure and impact tests, all bending and breakage occurs in the stronger (large diameter) shank member. Thus, the assembly can be made much smaller and still be as strong or stronger.

Since the two-piece design of the present invention enjoys a considerable performance advantage of the prior art one-piece design, this performance advantage can be traded off into making the entire assembly smaller, while retaining the performance levels enjoyed by the prior art one-piece design. This results in a considerable reduction of both cost and weight, both very important factors in contemporary vehicle design. This trade off factor also supports future automotive industry plans to apply individual, somewhat smaller brake motors at each wheel, with the individual motors controlled by a central microcomputer. The present invention makes such a scenario much more feasible.

As previously mentioned, the two-piece invention of the present invention also provides the opportunity to reduce cost by optimizing the choice of materials used for the shank member and the cam pin. While the cam requires hardening because of the stresses to which it is subjected, the elongated shank member of the assembly is not subject to the same kind of stresses. Hence, using a relatively inexpensive material to form the elongated shank member of the shaft represents a significant cost reduction to the manufacturer. This cost advantage synergistically combines with the other advantages noted above to result in a novel electric motor shaft with considerably increased performance which is easier to fabricate and uses less and cheaper materials.

The illustrated embodiments of the two-piece motor shaft of the present invention are intended to be used as part of the actuation system for anti-lock brakes. However, it is also to be understood that the present invention has broader application in electric motors and may be used in other types of applications.

Thus, while the present invention has been described with reference to certain embodiments and exemplifications thereof, it is possible that one of skill in the art of electric motor shaft design may, having had the benefit of the teachings of the present invention, design certain variations of the present invention without departing from the scope thereof. Thus, it is the claims appended hereto, and all reasonable equivalents thereof, rather than the exact depicted embodiments and exemplifications, which define the true scope of the present invention.

I claim:

1. A two-piece electric motor shaft assembly comprising:
   an elongated shank member having a length and an outer diameter and defining a first longitudinal axis, said elongated shank member having a cavity extending along part of the length of the shank member and opening out onto an end thereof, said cavity having a second longitudinal axis parallel to and radially offset from said first longitudinal axis;
   a cam pin having a first end and a second end thereof, said first end of said cam pin being configured to be received into said elongated shank member cavity, said second end of said cam pin forming a camming surface being disposed along said second longitudinal axis, and
   means for securing said cam pin to said shank member.

2. The shaft assembly of claim 1 wherein the shank member is formed of a first material having a first index of hardness and the cam pin is formed of a second material having a second index of hardness, the second index of hardness being substantially greater than the first.

3. The shaft assembly of claim 2 wherein the first material is cold rolled steel.

4. The shaft assembly of claim 2 wherein the second material is a carbon steel alloy.

5. A method of manufacturing an electric motor shaft assembly comprising:
   forming an elongated shank member having a length and defining a first longitudinal axis;
   forming a cavity at an end of said elongated shank member, said cavity extending for a portion of the length of said shank member and opening out onto said end, said cavity defining a second longitudinal axis parallel to and radially offset with respect to said first longitudinal axis;
   forming a cam pin having a first end configured to be received into said elongated shank member cavity and a second end;
   forming a camming surface on said second end of said cam pin;
   securing said first end of said cam pin into said shank member cavity.

6. The method of claim 5 further comprising the steps of:
   forming said elongated shank member of a first material having a first index of hardness; and
   forming said cam pin of a second material having a second index of hardness, said second index of hardness being substantially greater than first hardness.

7. The method of claim 6 wherein the step of forming said elongated shank member of a first material comprises the step of forming said shank member of cold rolled steel, and the step of forming the cam pin of a second material comprises the step of forming the cam pin of carbon steel alloy.

8. The method of claim 5 comprising the further steps of hardening and grinding said camming surface.

* * * * *